United States Patent
Masters et al.

(10) Patent No.: US 12,270,010 B2
(45) Date of Patent: Apr. 8, 2025

(54) REDUCED-RESIDUE HARD SURFACE CLEANER AND METHOD FOR DETERMINING FILM/STREAK

(71) Applicant: STEPAN COMPANY, Northfield, IL (US)

(72) Inventors: Ronald A. Masters, Glenview, IL (US); Mona Marie Knock, Barrington, IL (US); Patrick Shane Wolfe, Palatine, IL (US); Timothy A. Boebel, Wilmette, IL (US); Xue Min Dong, Lincolnshire, IL (US); Dennis S. Murphy, Libertyville, IL (US)

(73) Assignee: STEPAN COMPANY, Northfield, IL (US)

( * ) Notice: Subject to any disclaimer, the term of this patent is extended or adjusted under 35 U.S.C. 154(b) by 432 days.

(21) Appl. No.: 17/151,441

(22) Filed: Jan. 18, 2021

(65) Prior Publication Data

US 2021/0139815 A1    May 13, 2021

Related U.S. Application Data

(63) Continuation of application No. PCT/US2019/041520, filed on Jul. 12, 2019.

(60) Provisional application No. 62/701,182, filed on Jul. 20, 2018, provisional application No. 62/826,115, filed on Mar. 29, 2019.

(51) Int. Cl.
| | |
|---|---|
| C11D 1/00 | (2006.01) |
| C11D 1/66 | (2006.01) |
| C11D 1/72 | (2006.01) |
| C11D 1/722 | (2006.01) |
| C11D 1/82 | (2006.01) |
| C11D 3/20 | (2006.01) |
| C11D 3/26 | (2006.01) |
| C11D 3/30 | (2006.01) |
| C11D 3/32 | (2006.01) |
| C11D 3/37 | (2006.01) |
| C11D 17/00 | (2006.01) |

(52) U.S. Cl.
CPC .............. C11D 1/66 (2013.01); C11D 3/2086 (2013.01); C11D 3/3792 (2013.01); C11D 17/0008 (2013.01)

(58) Field of Classification Search
CPC .. C11D 1/00; C11D 1/72; C11D 1/722; C11D 1/82; C11D 3/042; C11D 3/26; C11D 3/30; C11D 3/32; C11D 3/3723; C11D 3/3769
See application file for complete search history.

(56) References Cited

U.S. PATENT DOCUMENTS

| | | |
|---|---|---|
| 3,155,591 A | 11/1964 | Hilfer |
| 3,929,678 A | 12/1975 | Laughlin |
| 3,959,461 A | 5/1976 | Bailey et al. |
| 4,275,055 A | 6/1981 | Nachtigal et al. |
| 4,285,841 A | 8/1981 | Barrat et al. |
| 4,387,090 A | 6/1983 | Bolich, Jr. |
| 4,689,168 A | 8/1987 | Requejo |
| 4,828,757 A | 5/1989 | Naylor et al. |
| 5,252,245 A | 10/1993 | Garabedian, Jr. et al. |
| 5,342,534 A | 8/1994 | Skrobala et al. |
| 5,362,422 A | 11/1994 | Masters |
| 5,585,342 A | 12/1996 | Choy et al. |
| 5,726,139 A | 3/1998 | Willey et al. |
| 5,814,590 A | 9/1998 | Sherry et al. |
| 5,929,022 A | 7/1999 | Velazquez |
| 5,939,059 A | 8/1999 | Franklin et al. |
| 6,281,178 B1 | 8/2001 | Ryklin et al. |
| 6,284,723 B1 | 9/2001 | Zhou et al. |
| 6,342,474 B1 | 1/2002 | Kerobo |
| 6,372,706 B1 | 4/2002 | Boulos |

(Continued)

FOREIGN PATENT DOCUMENTS

| | | |
|---|---|---|
| CO | 4930310 A1 | 6/2000 |
| CO | 6541594 A2 | 10/2012 |

(Continued)

OTHER PUBLICATIONS

Office Action (including English translation) for App. No. EA202190074/28, dated Feb. 14, 2022, 7 pages.
Colombian Office Action issued in App. No. NC20210001235, dated May 4, 2022, 9 pages.
Office Action (including English translation) issued in App. No. EA202190074/28, dated Jun. 27, 2022, 2 pages.
The JEFFAMINE® Polyetheramines, Huntsman Advertising Literature, Copyright © 2007 Huntsman Corporation. 6 page document.

(Continued)

*Primary Examiner* — Brian P Mruk
(74) *Attorney, Agent, or Firm* — DILWORTH IP, LLC

(57) ABSTRACT

Dilutable concentrates useful for hard surface cleaners with improved film/streak performance on high-energy surfaces are disclosed. The concentrates comprise a nonionic alkoxylated surfactant and a polyetheramine. A relatively minor proportion of a polyetheramine can resolve film/streak issues that characterize hard surface cleaners formulated with nonionic surfactants. The efficacy of polyetheramines for improving film/streak performance of hard surface cleaners formulated with nonionic alkoxylated surfactants far exceeds the benefits available from known improvements, such as the use of hydrotropes. Other inventive dilutable concentrates and hard surface cleaners comprise an amine-functional hydrophobe and an auxiliary surfactant. Still other dilutable concentrates or hard surface cleaners comprise a nonionic alkoxylated surfactant and lactic acid. An improved method for measuring film/streak properties of hard surface cleaners is also disclosed.

11 Claims, No Drawings

(56) References Cited

U.S. PATENT DOCUMENTS

| | | | |
|---|---|---|---|
| 6,399,553 | B1 | 6/2002 | Cable et al. |
| 6,420,326 | B1 | 7/2002 | Maile et al. |
| 6,432,897 | B1 | 8/2002 | Cable |
| 6,489,285 | B2 | 12/2002 | Faber |
| 6,511,953 | B1 | 1/2003 | Fontana et al. |
| 6,528,070 | B1 | 3/2003 | Bratescu et al. |
| 6,605,584 | B2 | 8/2003 | Fong et al. |
| 6,949,498 | B2 | 9/2005 | Murphy et al. |
| 7,851,581 | B2 | 12/2010 | Czech et al. |
| 7,872,053 | B2 | 1/2011 | Wagner et al. |
| 8,193,144 | B2 | 6/2012 | Tanner et al. |
| 8,563,496 | B2 | 10/2013 | Cermenati et al. |
| 8,618,041 | B2 | 12/2013 | Toussaint et al. |
| 9,670,433 | B1 | 6/2017 | Hodge et al. |
| 9,777,248 | B2 | 10/2017 | Masters |
| 9,957,467 | B2 | 5/2018 | Di Capua et al. |
| 10,188,102 | B2 | 1/2019 | Policello et al. |
| 2002/0142929 | A1 | 10/2002 | Smith |
| 2002/0173438 | A1 | 11/2002 | Levitt et al. |
| 2003/0158344 | A1 | 8/2003 | Rodriques et al. |
| 2011/0278194 | A1* | 11/2011 | Zhu .................. C11D 3/30 206/524.7 |
| 2015/0057212 | A1 | 2/2015 | Hulskotter et al. |
| 2015/0184855 | A1 | 7/2015 | Kang |
| 2015/0275142 | A1 | 10/2015 | Hulskotter |
| 2015/0315524 | A1 | 11/2015 | Hulskotter et al. |
| 2016/0075970 | A1 | 3/2016 | Hulskotter et al. |
| 2016/0090561 | A1 | 3/2016 | Hulskotter et al. |
| 2016/0090563 | A1 | 3/2016 | Loughnane et al. |
| 2017/0121642 | A1* | 5/2017 | Loughnane .......... C11D 3/3723 |
| 2017/0321152 | A1* | 11/2017 | Meine ................ C11D 1/04 |

FOREIGN PATENT DOCUMENTS

| | | | | |
|---|---|---|---|---|
| DE | 102009001559 | A1 | 12/2009 | |
| EP | 0859044 | A1 | 8/1998 | |
| WO | 9919448 | A1 | 4/1999 | |
| WO | 0100758 | A2 | 1/2001 | |
| WO | 01000758 | A3 | 1/2001 | |
| WO | WO 01/00758 | * | 1/2001 | |
| WO | 2014042961 | A1 | 3/2014 | |
| WO | 2014185927 | A1 | 11/2014 | |
| WO | 2015144497 | A1 | 10/2015 | |
| WO | 2015148360 | A1 | 10/2015 | |
| WO | 2015148890 | A1 | 10/2015 | |
| WO | WO 2015/148360 | * | 10/2015 | ............... C11D 1/42 |
| WO | WO 2017/014868 | * | 1/2017 | ............... C11D 3/04 |
| WO | 2017200737 | A1 | 11/2017 | |

OTHER PUBLICATIONS

Partial European Search Report issued in App. No. EP232054130, dated Feb. 8, 2024, 16 pages.

Examination Report No. 1 issued in App. No. AU2019304923, dated Mar. 27, 2024, 4 pages.

Extended European Search Report issued in App. No. EP23205413, dated Apr. 23, 2024, 18 pages.

Non-Final Office Action issued in Brazilian Patent Application No. BR112021000999-0, dated May 15, 2024.

* cited by examiner

REDUCED-RESIDUE HARD SURFACE CLEANER AND METHOD FOR DETERMINING FILM/STREAK

This application is a continuation of PCT/US2019/041520, filed on Jul. 12, 2019, which claims benefit of Ser. No. 62/701,182, filed on Jul. 20, 2018, which claims benefit of Ser. No. 62/826,115, filed on Mar. 29, 2019.

FIELD OF THE INVENTION

The invention relates to cleaners for high-energy hard surfaces that exhibit reduced filming or streaking when the cleaner dries from the surface. An improved method for measuring film/streak is also disclosed.

BACKGROUND OF THE INVENTION

Hard surface cleaners inevitably leave behind traces of residue from surfactants and other cleaner components along with any unremoved soils. Upon close inspection of the cleaned surface, especially high-energy surfaces such as glass or ceramic tile, the residues are evident as a film or streaks. Nonionic surfactants are particularly prone to film/streak issues, so they tend to be used only sparingly in hard surface cleaners. This is unfortunate given the wide variety of available nonionic surfactants.

In one approach to reducing film/streak, hard surface cleaners have been formulated to include a hydrotrope, such as sodium xylene sulfonate or sodium cumene sulfonate (see U.S. Pat. No. 6,281,178). Addition of the hydrotrope improves film/streak performance. However, even a tiny amount of film/streak can be noticeable to the naked eye. Moreover, the amount of hydrotrope needed to achieve a benefit roughly equals the amount of nonionic surfactant actives. Because the actives level of most hydrotropes is less than about 50%, a single product containing the nonionic surfactant and a hydrotrope is difficult to make available commercially.

Amine-functional polymers, especially polyetheramines, are frequently used as intermediates for making thermoset or thermoplastic products. Primary amino groups of these polymers react with epoxy resins, polyisocyanates, unsaturated nitriles, or carboxylic acids and their derivatives to give a variety of useful products. JEFFAMINE® polyetheramines from Huntsman are available in various molecular weights, amine functionalities, and EO/PO molar ratios and configurations. With some exceptions, amine-functional polymers have not been widely used as cleaner components.

U.S. Publ. No. 2015/0315524 describes dishwashing detergents that include polyetheramines made from 2,2-disubstituted 1,3-propanediol propoxylates. Compared with polyethylenimine-based additives, the polyetheramines were found to enhance the grease-cutting ability of detergents that also include an anionic surfactant, an amine oxide surfactant, and less than 2 wt. % (based on the combined surfactant amounts) of a nonionic surfactant. Film/streak performance of these compositions was not evaluated, and the minimal amount of nonionic surfactant used is consistent with other teachings in the art to use them sparingly.

Historically, it has been challenging to quantify filming separately from streaking as filming can hide streaking when an entire surface is wiped. Typically, qualitative assessments using panels of experienced judges are used. Some methods of applying and removing the cleaner are more technical in nature while others attempt to mimic consumer behavior. For some examples, see U.S. Pat. Nos. 5,252,245; 5,342,534; 5,362,422; 5,585,342; 5,726,139; 6,281,178; and 6,432,897.

The industry would benefit from ways to expand the usefulness of nonionic surfactants in hard surface cleaners. Hard surface cleaners that can tolerate a higher is proportion of nonionic surfactant without suffering from poor film/streak performance are needed. Ideally, a solution to the film/streak issue could be identified that uses easily synthesized or readily available products and improves film/streak performance in hard surface cleaning for a wide variety of commercially available nonionic surfactants. An improved method for quantifying film/streak, preferably one that can generate more consistent results than are available by visual inspection, is also needed.

SUMMARY OF THE INVENTION

In one aspect, the invention relates to a dilutable concentrate for hard surface cleaners with improved film/streak performance on high-energy surfaces. The concentrate comprises 25 to 95 wt. % of a nonionic alkoxylated surfactant and 2 to 30 wt. % of a polyetheramine, both wt. % values based on the amount of concentrate. Hard surface cleaners comprising water and the concentrate are included. We surprisingly found that a relatively minor proportion of a polyetheramine can resolve film/streak issues that characterize hard surface cleaners formulated with nonionic alkoxylated surfactants. The efficacy of polyetheramines for improving film/streak performance of hard surface cleaners formulated with nonionic alkoxylated surfactants far exceeds the benefits available from known improvements, such as the use of hydrotropes.

In another aspect, the invention includes a dilutable concentrate for hard surface cleaners with improved film/streak performance on high-energy surfaces. This concentrate comprises 1 to 99 wt. % of an amine-functional hydrophobe and 1 to 99 wt. % of one or more auxiliary surfactants, with both wt. % values based on the amount of dilutable concentrate. Hard surface cleaners comprising water and the concentrate are included. In this aspect, the alkoxylated component is built into the amine-functional hydrophobe rather than being two separate components as described earlier.

In yet another aspect, the invention includes a dilutable concentrate for hard surface cleaners with improved film/streak performance on high-energy surfaces. This concentrate comprises 25 to 95 wt. % of a nonionic alkoxylated surfactant and 2 to 30 wt. % of lactic acid, with both wt. % values based on the amount of dilutable concentrate. Hard surface cleaners comprising water and the concentrate are included. Lactic acid is provides desirable disinfectant or sanitizer properties and enhanced film/streak performance when used in the polyetheramine-containing formulations described above. Moreover, we surprisingly found that lactic acid can improve film/streak performance even in the absence of a polyetheramine.

In other aspects, the invention includes methods for improving film/streak performance on high-energy surfaces of a hard surface cleaner comprising a nonionic alkoxylated surfactant. These methods comprise formulating the cleaner to contain a polyetheramine or lactic acid in an amount effective to improve the film/streak performance of the cleaner by at least 10% compared with the film/streak performance obtainable from the cleaner in the absence of the polyetheramine.

The invention includes a method for measuring film/streak properties of a hard surface cleaner sample. First, one or more drops of a sample are applied to one edge of a hard surface, preferably a high-energy surface. Distinct, uniform, treated and untreated lanes are created by drawing the drops across the surface. After the surface dries, it is illuminated at or about the Brewster angle to optimize detection of film/streak. The surface is then digitally imaged, and the span of luma deviation between the treated and untreated lanes is determined to compute a combined film/streak value for the cleaner sample. The method improves on prior visual techniques with reproducible, quantitative data that combine film and streak information into a single value.

DETAILED DESCRIPTION OF THE INVENTION

In some aspects, dilutable concentrates of the invention comprise a nonionic alkoxylated surfactant and a polyetheramine.

Nonionic Alkoxylated Surfactant

The hard surface cleaners include a nonionic alkoxylated surfactant. Suitable surfactants of this type are at least partially soluble in water and may be very soluble in water. Alkoxylated refers to alkylene oxide units, which may be ethylene oxide units or combinations of ethylene oxide units and propylene oxide or other alkylene oxides. In preferred aspects, at least 50%, at least 70%, at least 90%, or 100% of the alkylene oxide units in the nonionic alkoxylated surfactant are from ethylene oxide.

Suitable nonionic alkoxylated surfactants include, for example, alcohol alkoxylates, alkylphenol alkoxylates, fatty amide alkoxylates, fatty amine alkoxylates, alkoxylated carbohydrate esters, alkoxylated alkanolamides, alkoxylated oils, siloxane alkoxylates, and the like, and combinations thereof. In some aspects, the nonionic alkoxylated surfactant is selected from linear or branched $C_8$-$C_{14}$ alcohol alkoxylates, EO-PO block copolymers, alkoxylated fatty amides, alkoxylated oils, alkoxylated carbohydrate esters, siloxane alkoxylates, and mixtures thereof.

Preferred classes include $C_8$-$C_{14}$ alcohol ethoxylates, alkylphenol ethoxylates, fatty amide ethoxylates, fatty amine ethoxylates, ethoxylated carbohydrate esters, ethoxylated alkanolamides, ethoxylated oils, siloxane ethoxylates, and the like, and combinations thereof. Preferred ethoxylated compositions have an average of 1 to 20, preferably 2 to 10 or 2 to 5 oxyethylene units per molecule.

Many suitable nonionic alkoxylated surfactants are commercially available. Alcohol ethoxylates and alkylphenol ethoxylates include those available from Stepan Company under the BIO-SOFT®, MAKON®, and POLYSTEP® marks, such as BIO-SOFT® N1-3, BIO-SOFT® N1-5, BIO-SOFT® N1-7, BIO-SOFT® N1-9, BIO-SOFT® N23-3, BIO-SOFT® N23-6.5, BIO-SOFT® N25-3, BIO-SOFT® N25-7, BIO-SOFT® N25-9, BIO-SOFT® N91-2.5, BIO-SOFT® N91-6, BIO-SOFT® N91-8, BIO-SOFT® E-678, BIO-SOFT® E-690, BIO-SOFT® ET-650, MAKON® 4, MAKON® 6, MAKON® 8, MAKON® 10, MAKON® 12, MAKON® OP-9, MAKON® NF-12, MAKON® NF-5, MAKON® DA-4, MAKON® DA-6, MAKON® DA-9, MAKON® TD-3, MAKON® TD-6, MAKON® TD-9, MAKON® TSP-16, POLYSTEP® F-3, POLYSTEP® F-4, POLYSTEP® TD-129, POLYSTEP® TD-189, and the like.

Suitable alcohol ethoxylates include linear or branched secondary alcohol ethoxylates, such as those supplied by Dow Chemical under the TERGITOL® mark. Examples include TERGITOL® 15-S-3, TERGITOL® 15-S-5, TERGITOL® 15-S-7, TERGITOL® 15-S-9, TERGITOL® 15-S-7, TERGITOL® 15-S-12, TERGITOL® TMN-3, TERGITOL® TMN-6, and the like.

Suitable amine ethoxylates include ethoxylated cocamines, for example, Stepan's TOXIMUL® CA-2 and TOXIMUL® CA-7.5.

Suitable ethoxylated carbohydrate esters include ethoxylated sorbitol esters such as Stepan's TOXIMUL® SEE-340 and TOXIMUL® SEE-341.

Suitable ethoxylated alkanolamides include PEG cocamides and PEG lauramides, for example, Stepan's NINOL® C-4, NINOL® C-5, and NINOL® L-5.

Suitable ethoxylated oils include ethoxylated castor oils, for example, Stepan's TOXIMUL® 8240, TOXIMUL® 8241, TOXIMUL® 8242, STEPANTEX® CO-30, STEPANTEX® CO-36, and STEPANTEX® CO-40.

Suitable siloxane alkoxylates have two or more siloxane units and one or more alkoxylated chains. In some aspects, the alkoxylated chains are made up of EO units, PO units, or any combination of these in random or block configuration. Trisiloxane ethoxylates are a preferred class of siloxane alkoxylates. Preparation of siloxane alkoxylates is described, for instance, in U.S. Pat. Nos. 7,872,053; 7,851,581; and 10,188,102, the teachings of which are incorporated herein by reference.

Siloxane alkoxylates are commercially available from Momentive Performance Chemicals, Inc. under the SILWET® trademark. Examples include SILWET® L-77, SILWET® L-722, SILWET® Hydro 611, SILWET® L-7200, SILWET® L-7220, SILWET® L-7280, SILWET® L-7600, SILWET® L-7602, SILWET® L-7604, SILWET® L-7607, SILWET® L-7608, SILWET® 806, and the like.

Some trisiloxane alkoxylates are known to hydrolyze in aqueous solutions outside the pH range of 6 to 7.5 (see U.S. Pat. No. 7,872,053 at col. 2, ll. 39-42). When such hydrolysis occurs, the trisiloxane alkoxylate loses its otherwise remarkable ability to wet a surface. We surprisingly found that this undesirable hydrolysis reaction can be avoided by using the siloxane alkoxylate in combination with a major proportion of a traditional nonionic surfactant, such as an alcohol ethoxylate. Thus, in some aspects, a minor proportion of a siloxane alkoxylate (for instance 1 to 20 wt. % or 5 to 10 wt. % based on only the combined surfactant amounts) is used in combination with another nonionic surfactant (80 to 99 wt. % or 90 to 95 wt. %), such as an alcohol ethoxylate (see, e.g., Examples 65 and 69 below). The alcohol ethoxylate may micellize and thereby insulate the siloxane alkoxylate from hydrolysis that would otherwise occur in aqueous solution in the presence of the highly basic polyetheramine (see Table 13, below).

In general, the amount of nonionic alkoxylated surfactant used is 25 to 95 wt. % based on the amount of dilutable concentrate. In some aspects, the nonionic alkoxylated is surfactant is used in an amount within the range of 30 to 90 wt. %, or from 40 to 85 wt. %, based on the amount of dilutable concentrate.

Polyetheramine

The inventive concentrates include a polyetheramine. Suitable polyetheramines include at least one primary, secondary, or tertiary amino group and a relatively hydrophobic polyether group. Suitable polyetheramines can be monofunctional, difunctional, or polyfunctional. Preferred polyetheramines have average amine functionalities within the range of 1 to 8, from 1 to 6, or from 1 to 4. In preferred aspects, the backbone of the polyetheramine is composed mostly or completely of propylene oxide units, butylene oxide units, and/or recurring units of an epoxide other than ethylene oxide. A minor proportion of ethylene oxide units can be present as long as the overall structure is hydrophobic. The polyether backbone can include recurring units of other monomers that can copolymerize with epoxides, e.g., tetrahydrofuran.

In some aspects, the polyetheramines have a number-average molecular weight up to 5,000 g/mol, or from 300 to 2,000 g/mol, or from 300 to 1,000 g/mol.

In other aspects, the polyetheramine has at least 50 mole %, or at least 80 mole %, of oxypropylene units, oxybutylene units, or both, based on the combined amounts of oxyalkylene units.

In yet other aspects, the polyetheramine comprises recurring units of an alkylene oxide, a glycidyl ether, or combinations thereof.

Suitable polyetheramines can be synthesized by known methods; others are commercially available. Commercially available polyetheramines include JEFFAMINE® polyetheramines, products of Huntsman. These products can be monofunctional, difunctional, or polyfunctional. They can be linear or branched and can include primary, secondary, or tertiary amine groups. Examples include JEFFAMINE® ED-600, JEFFAMINE® ED-900, JEFFAMINE® M-600, JEFFAMINE® M-1000, JEFFAMINE® M-2005, JEFFAMINE® D-400, JEFFAMINE® D-2000, JEFFAMINE® T-403, JEFFAMINE® T-3000, JEFFAMINE® T-5000, JEFFAMINE® XTJ-435, JEFFAMINE® THF-170, and the like. JEFFAMINE® T-403 is particularly preferred.

Other suitable polyetheramines include reaction products of ethylenediamine with epoxides, especially products having an oxypropylene block at the ends of the molecule. Materials of this type are available from BASF under the TETRONIC® mark. Suitable compositions have an "R" in the number, such as TETRONIC® 90R4, a reaction product of ethylenediamine and ethylene oxide that is capped with oxypropylene units and has a number-average molecular weight of about 7200 g/mol. Others have been available as TETRONIC® 70R4, TETRONIC® 110R2, TETRONIC® 130R2, and TETRONIC® 150R1.

Suitable polyetheramines include compositions made by reacting a diol, triol, or higher polyol starter with one or more equivalents of an alkylene oxide per hydroxyl equivalent, followed by amination to replace free hydroxyl groups with primary amino groups. Suitable polyetheramines of this type are described, for example, in WO 2015/144497 and WO 2015/148360 (1,2-diol starters); U.S. Publ. Nos. 2016/0090561, 2016/0090563, and 2016/0075970 (2,2-dialkyl-1,3-propanediol starters); WO 2015/148890 (various diol starters); U.S. Publ. No. 2015/0057212 (glycerol or 2-alkylglycerol starters), and WO 2017/200737 (di- or polyglycerol starter), the teachings of which related to polyetheramines and their preparation are incorporated herein by reference.

The amount of polyetheramine used is 2 to 30 wt. % based on the amount of dilutable concentrate. In some aspects, the amount of polyetheramine is from 3 to 25 wt. %, or from 5 to 20 wt. %, based on the amount of dilutable concentrate.

The relative amounts of nonionic alkoxylated surfactant and polyetheramine will depend on numerous factors known to those skilled in the art, including the nature and amount of the nonionic alkoxylated surfactant and polyetheramine, the identity and amounts of other surfactants, requirements of the end use application, and other factors.

Optional Components

The dilutable concentrates optionally include up to 50 wt. %, or 0.1 to 45 wt. %, or 1 to 30 wt. %, based on the amount of dilutable concentrate, of a cosolvent, a builder, an auxiliary surfactant, or a mixture thereof. Suitable cosolvents, builders, and auxiliary surfactants are described further below. The concentrates can also contain some proportion of water, such as 1 to 25 wt. %, 2 to 20 wt. %, or 5 to 10 wt. % based on the is amount of dilutable concentrate.

Hard Surface Cleaners

The dilutable concentrates are normally diluted with water to produce aqueous hard surface cleaners. The cleaners comprise the concentrates, water, and possibly other components such as pH adjusters, dyes, fragrances, and the like. Water is normally a major component of hard surface cleaners. In preferred aspects, the cleaners comprise 50 to 99.9 wt. %, or 60 to 99 wt. %, of water. A typical all-purpose cleaner might comprise 0.1 to 5 wt. %, 0.2 to 3 wt. %, or 0.5 to 2 wt. % of the nonionic alkoxylated surfactant and up to 99 wt. % of water. A typical glass cleaner would be more dilute and might comprise 0.01 to 0.5 wt. %, 0.02 to 0.3 wt. %, or 0.05 to 0.2 wt. % of the nonionic alkoxylated surfactant and up to 99.9 wt. % of water. Generally, the amount of water in a hard surface cleaner will range from 50 to 99.9 wt. %, or 75 to 99.9 wt. %, or 90 to 99 wt. %, based on the amount of hard surface cleaner.

In another aspect, the invention includes other dilutable concentrates for hard surface cleaners with improved film/streak performance on high-energy surfaces. In this aspect, the cleaners comprise 1 to 99 wt. %, or 10 to 90 wt. %, of an amine-functional hydrophobe, and 1 to 99 wt. %, or 10 to 90 wt. %, of one or more auxiliary surfactants. The wt. % amounts are based on the amount of dilutable concentrate. Auxiliary surfactants include anionic, nonionic, cationic, zwitterionic, and amphoteric surfactants, and mixtures thereof.

In the amine-functional hydrophobe, the alkoxylated component and amine are "built in" rather than being two separate components as described earlier. Suitable amine-functional hydrophobes include a primary, secondary, or tertiary amine group located near the terminus of the molecule, and a hydrophobic tail, preferably composed of recurring units of alkylene oxides, glycidyl ethers, or combinations thereof. For instance, suitable amine-functional hydrophobes of this kind can be made by reacting 2-(N-methylanilino)ethanol with 10 to 20 equivalents, preferably about 14 equivalents, of propylene oxide followed by reaction with 2 to 10 equivalents, preferably 4, 6, or 8 equivalents, of ethylene oxide (see Examples 59-61, below). Interestingly, this nonionic alkoxylate with integrated amine functionality exhibits, in one molecule, improved is film/streak properties when compared with nonionic alkoxylated surfactants that have no amine functionality (see Table 11). In some cases, the improved film/streak results rival what can be achieved by using a combination of a conventional nonionic alkoxylated surfactant and a polyetheramine additive.

In some aspects, the dilutable concentrates based on an amine-functional hydrophobe further comprise a builder, a cosolvent (especially a $C_8$-$C_{14}$ N,N-dialkyl amide), or a combination thereof. Any of the dilutable concentrates based on an amine-functional hydrophobe can be diluted with water as described earlier to produce a suitable hard surface cleaner.

In other aspects, any of the dilutable concentrates or hard surface cleaners described above can include a disinfecting or sanitizing proportion of lactic acid, preferably high-purity (99+%) lactic acid, and in some aspects, L-lactic acid. In preferred hard surface cleaners, the amount of lactic acid is preferably within the range of 0.01 to 10 wt. %, or from 0.1 to 5 wt. %, or from 1 to 3 wt. %, based on the amount of hard surface cleaner (see Table 7, Ex. 39).

In yet other aspects, the invention relates to a dilutable concentrate comprising 25 to 95 wt. %, or 30 to 90 wt. %, of a nonionic alkoxylated surfactant and 2 to 30 wt. %, or 3 to 20 wt. %, of lactic acid, preferably L-lactic acid. The nonionic alkoxylated surfactant is selected from $C_8$-$C_{14}$ alcohol alkoxylates, EO-PO block copolymers, alkoxylated fatty amides, alkoxylated oils, alkoxylated carbohydrate esters, siloxane alkoxylates, and mixtures thereof. Optionally, these dilutable concentrates comprise up to 50 wt. %, or 0.1 to 30 wt. %, of a cosolvent, a builder, an auxiliary surfactant, or a mixture thereof, where the wt. % values are based on the amount of dilutable concentrate. Thus, in this aspect, there is no need for a polyetheramine or an amine-functional polymer. We surprisingly found that lactic acid alone is effective for improving the streak/film performance on high-energy surfaces of aqueous hard surface cleaners comprising a nonionic alkoxylated surfactant (see Table 7, Example 40). The lactic acid-based dilutable concentrates described here can be diluted with water as described earlier to produce a suitable hard surface cleaner.

In some aspects, the inventive dilutable concentrates or hard surface cleaners include a builder or chelating agent. Suitable builders or chelating agents include, for is example, citric acid, citrate salts, sodium carbonate, EDTA, methylglycinediacetic acid trisodium salt (TRILON® M, product of BASF), L-glutamic acid N,N-diacetic acid, tetrasodium salt ("GLDA-$Na_4$" available as DISSOLVINE® GL chelating agent, product of AkzoNobel), and the like. As Table 8 shows, builders or chelating agents can adversely impact film/streak properties, although in many cases, including a polyetheramine can mitigate this effect. The results with the ubiquitous chelating agent EDTA (Example 46) are particularly noteworthy.

In some aspects, the inventive dilutable concentrates or hard surface cleaners have a pH within the range of 2 to 10, preferably from 3 to 9. In some aspects, the pH is unadjusted and reflects the level and kind of polyetheramine used. Unadjusted compositions containing the polyetheramines commonly have a pH value of about 10. In other aspects, the pH of the dilutable concentrate or hard surface cleaner is adjusted downward by addition of an acid such as hydrochloric acid. Film/streak performance remains excellent over a broad pH range, at least from 3.0 to 9.0, as shown in Table 9, Examples 51-54. When pH is adjusted higher to 11 using a strong base such as monoethanolamine, film/streak performance can suffer (Table 9, Comparative Example 50).

In other aspects, the invention relates to methods for improving film/streak performance on high-energy surfaces of a hard surface cleaner comprising a nonionic alkoxylated surfactant. The methods comprise formulating the cleaner to contain a polyetheramine or lactic acid in an amount effective to improve the film/streak performance of the cleaner by at least 10%, or at least 30%, or at least 50%, compared with the film/streak performance obtainable from the cleaner in the absence of the polyetheramine. Film/streak performance is conveniently analyzed and quantified using the inventive method described further below.

Other Surfactants

The dilutable concentrates and hard surface cleaners can include an auxiliary surfactant, including anionic surfactants, amphoteric surfactants, zwitterionic surfactants, cationic surfactants, other nonionic surfactants, and combinations thereof.

Anionic Surfactants

The primary cleaning surfactant is preferably an anionic surfactant. Suitable classes of anionic surfactants include, for example, alkyl sulfates, alkyl ether sulfates, olefin sulfonates, α-sulfonated alkyl esters (particularly α-sulfonated methyl esters), α-sulfonated alkyl carboxylates, alkyl aryl sulfonates, sulfoacetates, sulfosuccinates, alkane sulfonates, and alkylphenol alkoxylate sulfates, and the like, and mixtures thereof.

In particular, anionic surfactants useful herein include those disclosed in *McCutcheon's Detergents & Emulsifiers* (M.C. Publishing, N. American Ed., 1993); Schwartz et al., *Surface Active Agents, Their Chemistry and Technology* (New York: Interscience, 1949); and in U.S. Pat. Nos. 4,285,841 and 3,919,678, the teachings of which are incorporated herein by reference.

Suitable anionic surfactants include salts (e.g., sodium, potassium, ammonium, and substituted ammonium salts such as mono-, di-, and triethanolamine salts) of anionic sulfate, sulfonate, carboxylate and sarcosinate surfactants. Other suitable anionic surfactants include isethionates (e.g., acyl isethionates), N-acyl taurates, fatty amides of methyl tauride, alkyl succinates, glutamates, sulfoacetates, and sulfosuccinates, monoesters of sulfosuccinate (especially saturated and unsaturated $C_{12}$-$C_{18}$ monoesters), diesters of sulfosuccinate (especially saturated and unsaturated $C_6$-$C_{14}$ diesters), and N-acyl sarcosinates. Resin acids and hydrogenated resin acids are also suitable, such as rosin, hydrogenated rosin, and resin acids and hydrogenated resin acids present in or derived from tallow oil.

Suitable anionic surfactants include linear and branched primary and secondary alkyl sulfates, alkyl ethoxysulfates, fatty oleyl glycerol sulfates, alkyl phenol ethoxylate sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside. Preferred alkyl sulfates include $C_8$-$C_{22}$, more preferably $C_8$-$C_{16}$, alkyl sulfates. Preferred alkyl ethoxysulfates are $C_8$-$C_{22}$, more preferably $C_8$-$C_{16}$, alkyl sulfates that have been ethoxylated with from 0.5 to 30, more preferably from 1 to 30, moles of ethylene oxide per molecule.

Other suitable anionic surfactants include salts of $C_5$-$C_{20}$ linear alkylbenzene sulfonates, alkyl ester sulfonates, $C_6$-$C_{22}$ primary or secondary alkane sulfonates, $C_6$-$C_{24}$ olefin sulfonates, alkyl glycerol sulfonates, fatty acyl glycerol sulfonates, fatty oleyl glycerol sulfonates, and any mixtures thereof.

Suitable anionic surfactants include $C_8$-$C_{22}$, preferably $C_8$-$C_{18}$, alkyl sulfonates and $C_8$-$C_{22}$, preferably $C_{12}$-$C_{18}$, α-olefin sulfonates. Suitable anionic carboxylate surfactants include alkyl ethoxy carboxylates, alkyl polyethoxy polycarboxylate surfactants and soaps ("alkyl carboxyls"). Preferred sulfosuccinates are $C_8$-$C_{22}$ sulfosuccinates, preferably mono-$C_{10}$-$C_{16}$ alkyl sulfosuccinates such as disodium laureth sulfosuccinate.

Suitable anionic surfactants include sarcosinates of the formula $RCON(R_1)CH_2COOM$, wherein R is a $C_5$-$C_{22}$ linear or branched alkyl or alkenyl group, $R_1$ is $C_1$-$C_4$ alkyl and M is an ion. Preferred sarcosinates include myristyl and oleoyl methyl sarcosinates as sodium salts. Most preferably, the sarcosinate is a $C_{10}$-$C_{16}$ sarcosinate.

Suitable anionic surfactants include alkyl sulfoacetates of the formula $RO(CO)CH_2SO_3M$, wherein R is $C_{12}$-$C_{20}$ alkyl and M is an ion, preferably lauryl and myristyl sulfoacetates as sodium salts.

Many suitable anionic surfactants are commercially available from Stepan Company and are sold under the ALPHA-STEP®, BIO-SOFT®, BIO-TERGE®, CEDEPAL®, NACCONOL®, NINATE®, POLYSTEP®, STEOL®, STEPANATE®, STEPANPOL®, STEPANTAN®, and STEPOSOL® trademarks. For further examples of suitable anionic surfactants, see U.S. Pat. No. 6,528,070, the teachings of which are incorporated herein by reference.

Additional examples of suitable anionic surfactants are described in U.S. Pat. Nos. 3,929,678, 5,929,022, 6,399,553, 6,489,285, 6,511,953, 6,949,498, and U.S. Pat. Appl. Publ. No. 2010/0184855, the teachings of which are incorporated herein by reference.

Cationic and Amphoteric Surfactants

Suitable cationic surfactants include fatty amine salts (including diamine or polyamine salts), quaternary ammonium salts, salts of fatty amine ethoxylates, quaternized fatty amine ethoxylates, and the like, and mixtures thereof. Useful cationic surfactants are disclosed in *McCutcheon's Detergents & Emulsifiers* (M.C. Publishing, N. American Ed., 1993); Schwartz et al., *Surface Active Agents, Their Chemistry and Technology* (New York: Interscience, 1949) and in U.S. Pat. Nos. 3,155,591; 3,929,678; 3,959,461; 4,275,055; and 4,387,090. Suitable anions include halogen, sulfate, is methosulfate, ethosulfate, tosylate, acetate, phosphate, nitrate, sulfonate, carboxylate, and the like.

Suitable quaternary ammonium salts include mono-long chain alkyl-tri-short chain alkyl ammonium halides, wherein the long chain alkyl group has from about 8 to about 22 carbon atoms and is derived from long-chain fatty acids, and wherein the short chain alkyl groups can be the same or different but preferably are independently methyl or ethyl.

Specific examples include cetyl trimethyl ammonium chloride and lauryl trimethyl ammonium chloride. Preferred cationic surfactants include octyltrimethyl ammonium chloride, decyltrimethyl ammonium chloride, dodecyltrimethyl ammonium bromide, dodecyltrimethyl ammonium chloride, and the like. Cetrimonium chloride (hexadecyltrimethylammonium chloride) supplied as AMMONYX® Cetac 30, product of Stepan Company) is a preferred example.

Salts of primary, secondary and tertiary fatty amines are also suitable cationic surfactants. The alkyl groups of such amine salts preferably have from about 12 to about 22 carbon atoms and may be substituted or unsubstituted. Secondary and tertiary amine salts are preferred, and tertiary amine salts are particularly preferred. Suitable amine salts include the halogen, acetate, phosphate, nitrate, citrate, lactate and alkyl sulfate salts. Salts of, for example, stearamidopropyl dimethyl amine, diethylaminoethyl stearamide, dimethyl stearamine, dimethyl soyamine, soyamine, myristyl amine, tridecylamine, ethyl stearylamine, N-tallowpropane diamine, ethoxylated stearylamine, stearylamine hydrogen chloride, soyamine chloride, stearylamine formate, N-tallowpropane diamine dichloride stearamidopropyl dimethylamine citrate, and the like are useful herein.

Suitable cationic surfactants include imidazolines, imidazoliniums, and pyridiniums, and the like, such as, for example, 2-heptadecyl-4,5-dihydro-1H-imidazol-1-ethanol, 4,5-dihydro-1-(2-hydroxyethyl)-2-isoheptadecyl-1phenylmethylimidazolium chloride, and 142-oxo-2[[2-[(1-oxoctadecyl)oxy]ethyl]-amino]ethyl] pyridinium chloride. For more examples, see U.S. Pat. No. 6,528,070, the teachings of which are incorporated herein by reference. Other suitable cationic surfactants include quaternized esteramines or "ester quats," and as disclosed in U.S. Pat. No. 5,939,059, the teachings of which are incorporated herein by reference.

The cationic surfactant may be a DMAPA or other amidoamine-based quaternary ammonium material, including diamidoamine quats. It may also be a di- or poly-quaternary compound (e.g., a diester quat or a diamidoamine quat). Anti-microbial compounds, such as alkyldimethylbenzyl ammonium halides or their mixtures with other quaternary compounds, are also suitable cationic surfactants. An example is a mixture of an alkyl dimethylbenzyl ammonium chloride and an alkyl dimethyl ethylbenzylammonium chloride, available commercially from Stepan Company as BTC® 2125M.

Amphoteric (or zwitterionic) surfactants have both cationic and anionic groups in the same molecule, typically over a wide pH range. Suitable amphoteric surfactants include, for example, amine oxides, betaines, sulfobetaines, and the like. Specific examples include cocoamidopropylamine oxide, cetamine oxide, lauramine oxide, myristylamine oxide, stearamine oxide, alkyl betaines, cocobetaines, and amidopropyl betaines, (e.g., lauryl betaines, cocoamidopropyl betaines, lauramidopropyl betaines), and combinations thereof.

Many suitable cationic or amphoteric surfactants are commercially available from Stepan Company and are sold under the AMMONYX®, ACCOSOFT®, AMPHOSOL®, BTC®, STEPANQUAT®, and STEPANTEX® trademarks. For further examples of suitable cationic surfactants, see U.S. Pat. No. 6,528,070, the teachings of which are incorporated herein by reference. Other suitable surfactants are disclosed in U.S. Pat. Nos. 5,814,590, 6,281,178, 6,284,723, 6,605,584, and 6,511,953, the teachings of which related to those surfactants are incorporated herein by reference.

Other Nonionic Surfactants as Auxiliary Surfactants

In some aspects, the dilutable concentrates or hard surface cleaners can include an alkyl polyglucoside ("APG") or other alkyl polysaccharide surfactant. These surfactants can, in some cases, impart good film/streak properties when used as the only nonionic surfactant. It may be desirable for some applications to use both the nonionic alkoxylated surfactant described above and an APG surfactant. Suitable APG surfactants are available from BASF, Kao Chemicals, Huntsman (ECOTERIC® products), Dow Chemical (TRITON® BG or TRITON® CG series products), and other suppliers.

Organic Solvents

An organic solvent (also described herein as a "cosolvent"), preferably a water-soluble one, is optionally included in the dilutable concentrates and hard surface cleaners. Preferred solvents include alcohols, glycols (e.g., propylene glycol, dipropylene glycol, polypropylene glycols), glycol ethers, glycol ether esters, amides, esters, and the like. Examples include $C_1$-$C_6$ alcohols, $C_1$-$C_6$ diols, $C_3$-$C_{24}$ glycol ethers, and mixtures thereof. Suitable alcohols include, for example, methanol, ethanol, 1-propanol, isopropanol, 1-butanol, 1-pentanol, 1-hexanol, amyl alcohol, and mixtures thereof. Suitable glycol ethers include, e.g., ethylene glycol n-hexyl ether, ethylene glycol n-butyl ether, ethylene glycol n-propyl ether, propylene glycol methyl ether, propylene glycol n-propyl ether, propylene glycol tert-butyl ether, propylene glycol n-butyl ether, diethylene glycol n-butyl ether, dipropylene glycol methyl ether, dipropylene glycol n-propyl ether, and the like, and mixtures thereof. Suitable glycol ether esters include, for example, propylene glycol methyl ether acetate, propylene glycol n-butyl ether acetate, and the like. Suitable solvents are available from Eastman (EASTMAN™ mark), Dow Chemical (under the DOWANOL®, CARBITOL™, and CELLOSOLV™ marks), LyondellBasell, and other suppliers. Suitable amide solvents include saturated or unsaturated $C_8$-$C_{14}$ N,N-dialkyl amides, preferably a saturated or unsaturated $C_{10}$-$C_{12}$ N,N-dimethyl amide such as Stepan's HALLCOMID® M-8, HALLCOMID® M-8-10, HALLCOMID® M-10, NINOL® CAA, and STEPOSOL® MET-10U.

When included, organic solvents are typically used in an amount within the range of 0.1 to 25 wt. %, preferably 1 to 10 wt. %, and more preferably 3 to 8 wt. %, based on the amount of dilutable concentrate.

Other organic solvents suitable for use in hard surface cleaners are well known in the art and have been described for example, in U.S. Pat. Nos. 5,814,590, 6,284,723, 6,399,553, and 6,605,584, and in U.S. Pat. Appl. Publ. No. 2010/0184855, the teachings of which are incorporated herein by reference.

Other Components

The dilutable concentrates and hard surface cleaners can include additional conventional components. Commonly, the concentrates or cleaners include one or more additives such as builders, buffers, pH adjusters, abrasives, electrolytes, bleaching agents, fragrances, dyes, foaming control agents, antimicrobial agents, thickeners, pigments, gloss enhancers, enzymes, cosolvents, dispersants, polymers, silicones, hydrotropes, and the like.

Method for Determining Film/Streak

In another aspect, the invention relates to a method for measuring film/streak properties of a hard surface cleaner sample. One or more drops of cleaner sample is applied to one edge of a hard surface, preferably a high-energy surface. By "high-energy surface," we mean glass, ceramic tile, or the like. Distinct, uniform, treated and untreated lanes are then created by drawing the drops across the surface. A non-woven fabric such as spun-bonded polyester can be used for this step. The surface is then dried or is allowed to dry. The dried surface is then illuminated at or about the Brewster angle (roughly 90 degrees from incident light source to detector) to optimize detection of film/streak. It is convenient to use the Brewster angle as a starting point and to make fine adjustments until the appearance of any film/streak is maximized. The dried, illuminated surface is then digitally imaged, preferably with a digital camera and manual settings. The span of luma deviation between the treated and untreated lanes is then determined to compute a combined film/streak value for the sample. Readily available software such as "tracker.jar" can be used to quantify the results. For purposes of this invention, control samples include the nonionic alkoxylated surfactant but exclude any added polyetheramine or lactic acid. We surprisingly found that this method provides reproducible, reliable results by allowing a direct comparison of an untreated lane with an adjacent treated lane uniformly coated with any residue from the hard surface cleaner. Combining the film and streak information into a single, quantifiable value that is recordable digitially overcomes limitations of the more subjective results obtainable by visual inspection of expert panelists.

The following examples merely illustrate the invention; the skilled person will recognize many variations that are within the spirit of the invention and scope of the claims.

Dilutable Concentrate

A dilutable concentrate is prepared by combining BIO-SOFT® N91-6 (80 wt. %) with JEFFAMINE® T-403 (20 wt. %). Other suitable concentrates are prepared by combining a nonionic alkoxylated surfactant as described herein or in the tables below (25 to 95 wt. %, typically 80 to 95 wt. %) with a polyetheramine as described herein or in the tables below (2 to 30 wt. %, typically 5 to 20 wt. %). Optionally, the concentrates include up to 50 wt. % of a cosolvent, a builder, an auxiliary surfactant, or a mixture thereof.

Hard Surface Cleaners

Suitable hard surface cleaners are produced by diluting the concentrates described above with water. Preferred cleaners comprise 50 to 99.9 wt. % of water (based on the amount of cleaner). In the examples below, concentrates are typically diluted with water to 1.0 wt. % actives. Other suitable formulations could contain as little as 0.01 wt. % actives to 0.1 wt. % actives depending upon the intended use.

Method of Determining Film/Streak

Three black ceramic tiles (4"×4") are cleaned of any residue using deionized water followed by a solution of dilute isopropyl alcohol and acetic acid. Test products are applied in 3-5 drops along one edge of each dry tile using a disposable pipet. After the spots have been applied to all three tiles, a folded, spun-bonded polyester wipe is used to pull the spots in a uniform motion across each tile to create distinct lanes. A fresh surface of the wipe is used for each successive tile. After 15 minutes of drying time, each tile is imaged using a digital camera. The camera is positioned such that it views the tile from above and to the side at a 45° angle. Room lighting is located at a 45° angle on the opposite side of the tile so that the angle from light source to camera is about 90°, known as the Brewster angle. The same manual camera settings (exposure time, iso, aperture, and file size) are used for each image. For fine adjustment, the tile is positioned so that the direct reflection of light is just off the tile, which allows for optimum detection and quantification of film/streak. Images are analyzed using "tracker.jar," which is open-source software (Prof. Doug Brown, Cabrillo College, CA), to obtain a measure of maximum to minimum span of luma deviation across the dried product lanes and the untreated zones in between them. Triplicate runs are averaged and reported. Lower numbers reflect a lesser degree of film/streak. For tests on ceramic tile, the average max-min luma deviation for the same test products typically range from 10-80, with an overall average standard deviation of 3.7. Values of 10-20 are considered excellent.

TABLE 1

Film/Streak Results: BIO-SOFT ® N91-6 and Polyetheramines

| Ex. | | Film/streak value*, ceramic tile | % improved v. control |
|---|---|---|---|
| blank | No product applied | 16.4 | |
| control | BIO-SOFT ® N91-6 only | 40.3 | |
| | BIO-SOFT ® N91-6 + JEFFAMINE ® product**: | | |
| 1 | ED-600 | 37.4 | 7.2 |
| 2 | ED-900 | 34.8 | 14 |
| 3 | M-600 | 34.9 | 13 |
| 4 | M-1000 | 28.2 | 30 |
| 5 | M-2005 | 22.5 | 44 |
| 6 | D-400 | 20.0 | 50 |
| 7 | D-2000 | 21.1 | 48 |
| 8 | T-403 | 26.0 | 35 |
| 9 | T-3000 | 30.6 | 24 |

TABLE 1-continued

Film/Streak Results: BIO-SOFT ® N91-6 and Polyetheramines

| Ex. | | Film/streak value*, ceramic tile | % improved v. control |
|---|---|---|---|
| 10 | T-5000 | 28.5 | 29 |
| 11 | XTJ-435 | 29.5 | 27 |
| 12 | THF-170 | 20.3 | 50 |
| C13 | D-230 | 57.9 | (−44) |
| C14 | EDR-148 | 81.4 | (−100) |

*Avg. of at least 3 experiments.
**JEFFAMINE ® polyetheramines are products of Huntsman.
All examples tested at 1.0 wt. % actives (0.05 wt. % polyetheramine, 0.95 wt. % BIO-SOFT ® N91-6).

As shown in Table 1, a wide variety of commercially available JEFFAMINE® polyetheramines, when used as a 5:95 wt./wt. mixture with BIO-SOFT® N91-6, provide a substantial improvement in film/streak properties of a hard surface cleaner when compared with the control sample using only BIO-SOFT® N91-6. The 1.0 wt. % level of actives is a relatively high concentration designed to amplify and show differences in performance between the polyetheramines.

Tables 2 and 12, below, show that 10 wt. % of JEFFAMINE® T-403 reduces film/streak properties when combined with a wide range of nonionic alkoxylated surfactant classes.

TABLE 2

Film/Streak Results: Various Alkoxylates and JEFFAMINE ® T-403

| Ex. | Alkoxylate | Film/streak value*, ceramic tile | % improved v. control |
|---|---|---|---|
| blank | No product applied | 10.5 | |
| control | BIO-SOFT ® N91-6 | 41.3 | |
| 15 | BIO-SOFT ® N91-6 + JEFFAMINE ® T-403 | 16.1 | 61 |
| control | MAKON ® DA-6 | 51.4 | |
| 16 | MAKON ® DA-6 + JEFFAMINE ® T-403 | 16.4 | 68 |
| control | MAKON ® DA-4 | 75.6 | |
| 17 | MAKON ® DA-4 + JEFFAMINE ® T-403 | 46.9 | 38 |
| control | TERGITOL ® 15-S-9 | 46.5 | |
| 18 | TERGITOL ® 15-S-9 + JEFFAMINE ® T-403 | 18.1 | 61 |
| control | STEPANTEX ® CO-36 | 15.4 | |
| 19 | STEPANTEX ® CO-36 + JEFFAMINE ® T-403 | 10.0 | 35 |
| control | n-$C_{12}$-$C_{14}$ alcohol-5.4 EO-2.0 PO | 69.4 | |
| 20 | n-$C_{12}$-$C_{14}$ alcohol-5.4 EO-2.0 PO + JEFFAMINE ® T-403 | 26.4 | 62 |
| control | NINOL ® C-5 | 35.7 | |
| 21 | NINOL ® C-5 + JEFFAMINE ® T-403 | 15.3 | 57 |
| control | TOXIMUL ® SEE-340 | 38.2 | |
| 22 | TOXIMUL ® SEE-340 + JEFFAMINE ® T-403 | 25.3 | 34 |
| control | BIO-SOFT ® N1-9 + STEPOSOL ® MET-10U** | 65.9 | |
| 23 | BIO-SOFT ® N1-9 + STEPOSOL MET-10U + JEFFAMINE ® T-403 | 22.3 | 66 |

TABLE 2-continued

Film/Streak Results: Various Alkoxylates and JEFFAMINE ® T-403

| Ex. | Alkoxylate | Film/streak value*, ceramic tile | % improved v. control |
|---|---|---|---|
| control | EXXAL ® 9 2PO-6EO-2PO | 82.2 | |
| 24 | EXXAL ® 9 2PO-6EO-2PO + JEFFAMINE ® T-403 | 26.8 | 67 |

*Avg. of at least 3 experiments
Except as indicated otherwise, all examples tested at 1.0 wt. % actives (0.10 wt. % JEFFAMINE ® T-403, 0.90 wt. % alkoxylate).
**No additive: 0.72% N1-9, 0.28% MET-10U; with additive: 0.65% N1-9, 0.25% MET-10U, 0.10% T-403

TABLE 3

Film/Streak Results: Alkoxylates and a Diglycerol-based Polyetheramine (PEA)

| Ex. | Alkoxylate | Film/streak value*, ceramic tile | % improved v. control |
|---|---|---|---|
| blank | No product applied | 14.1 | |
| control | BIO-SOFT ® N91-6 | 33.8 | |
| 25 | BIO-SOFT ® N91-6 + JEFFAMINE ® T-403 | 14.2 | 58 |
| 26 | BIO-SOFT ® N91-6 + PEA | 16.5 | 51 |
| control | NINOL ® C-5 | 27.1 | |
| 27 | NINOL ® C-5 + PEA | 16.0 | 41 |
| control | MAKON ® NF 61-L | 23.7 | |
| 28 | MAKON ® NF 61-L + PEA | 18.2 | 23 |

*Avg. of at least 3 experiments
PEA is a diglycerol-started, butylene oxide-based polyetheramine, 730 g/mol.
All examples tested at 1.0 wt. % actives (0.10 wt. % polyetheramine, 0.90 wt. % alkoxylate).

TABLE 4

Film/Streak Results: BIO-SOFT ® N91-6 and JEFFAMINE ® T-403 Effect of Amount of Polyetheramine

| Ex. | BIO-SOFT ® N91-6 + JEFFAMINE ® T-403 | Film/streak value*, ceramic tile | % improved v. control |
|---|---|---|---|
| blank | No product applied | 14.1 | |
| control | 100% BIO-SOFT ® N91-6 | 33.8 | |
| 29 | 99% BIO-SOFT ® N91-6 + 1% T-403 | 25.9 | 23 |
| 30 | 95% BIO-SOFT ® N91-6 + 5% T-403 | 21.6 | 36 |
| 31 | 90% BIO-SOFT ® N91-6 + 10% T-403 | 13.9 | 59 |
| 32 | 80% BIO-SOFT ® N91-6 + 20% T-403 | 14.4 | 57 |

*Avg. of at least 3 experiments
All examples tested at 1.0 wt. % actives.

Table 3 shows that 10 wt. % of a diglycerol-started, butylene oxide-based polyetheramine (PEA) provides good film/streak results with several different nonionic alkoxylated surfactants.

Table 4 shows that as little as 1.0 wt. % of JEFFAMINE® T-403 provides a significant improvement in film/streak properties of a hard surface cleaner formulated with BIO-SOFT® N91-6, a common alcohol ethoxylate surfactant.

TABLE 5

Film/Streak Results: BIO-SOFT ® N1-9 with Polyetheramines v. Polyethylenimine (PEI)

| Ex. | Alkoxylate | Film/streak value*, ceramic tile | % improved v. control |
|---|---|---|---|
| blank | No product applied | 10.4 | |
| control | BIO-SOFT ® N1-9 | 56.0 | |
| 33 | BIO-SOFT ® N1-9 + 0.15% JEFFAMINE ® T-403 | 13.3 | 76 |
| 34 | BIO-SOFT ® N1-9 + 0.10% JEFFAMINE ® M-2005 | 37.8 | 33 |
| C35 | BIO-SOFT ® N1-9 + 0.10% polyethylenimine | 66.8 | (−19) |

*Avg. of at least 3 experiments
All examples tested at 1.0 wt. % actives.

TABLE 6

Film/Streak Results: BIO-SOFT ® N1-9 and Diethylenetriamine (DETA)

| Ex. | Alkoxylate | Film/streak value*, ceramic tile | % improved v. control |
|---|---|---|---|
| blank | No product applied | 14.0 | |
| control | BIO-SOFT ® N1-9, 1.0% | 44.7 | |
| C36 | BIO-SOFT ® N1-9, 0.90% + 0.10% diethylenetriamine | 66.8 | (−49) |

*Avg. of at least 3 experiments

Tables 5 and 6 show, respectively, that a polyethylenimine or diethylenetriamine, despite their high concentration of amine groups, fail to improve film/streak properties of hard surface cleaners formulated with nonionic alkoxylated surfactants.

TABLE 7

Film/Streak Results: MAKON ® DA-6 with Polyetheramines v. Other Diamines

| Ex. | Alkoxylate | Film/streak value*, ceramic tile | % improved v. control |
|---|---|---|---|
| blank | No product applied | 10.1 | |
| control | 1% MAKON ® DA-6 | 67.2 | |
| 37 | 0.9% MAKON ® DA-6 + 0.1% JEFFAMINE ® T-403 | 25.0 | 63 |
| 38 | 0.9% MAKON ® DA-6 + 0.1% TETRONIC ® 90R4 | 48.6 | 28 |
| 39 | 0.9% MAKON ® DA-6 + 0.1% JEFFAMINE ® T-403 + 2% lactic acid | 21.3 | 68 |
| 40 | 1% MAKON ® DA-6 + 2% L-lactic acid | 29.6 | 56 |
| C41 | 0.9% MAKON ® DA-6 + 0.1% 1,6-diaminohexane | 68.2 | (−1.5) |
| C42 | 0.9% MAKON ® DA-6 + 0.1% 1,12-diaminododecane | 64.1 | 4.6 |
| C43 | 0.9% MAKON ® DA-6 + 0.1% TETRONIC ® 701 | 65.7 | 2.2 |

*Avg. of at least 3 experiments
All examples tested at 1.0 wt. % actives.

Table 7 shows several interesting results. First, TETRONIC® products (from BASF, EO/PO block copolymers started using ethylenediamine, work better in reducing film/streak when the PO blocks are at the end of the molecule (as in Ex. 38 with TETRONIC® 90R4) rather than in the middle (as in Comparative Ex. 43 with TETRONIC® 701). Second, lactic acid can be used in combination with a polyetheramine (Ex. 39) to impart antimicrobial properties to a product while retaining good film/streak properties. Third, and surprisingly, lactic acid alone (i.e., without any polyetheramine) improves the film/streak performance of a hard surface cleaner formulated with a nonionic alkoxylated surfactant (Ex. 40).

TABLE 8

Film/Streak Results: Effect of Builders: BIO-SOFT ® N91-6 and JEFFAMINE ® T-403

| Ex. | BIO-SOFT ® N91-6 + additives | Film/streak value*, ceramic tile | % improved v. control |
|---|---|---|---|
| blank | No product applied | 16.0 | |
| control | no additive | 37.6 | |
| 44 | JEFFAMINE ® T-403 | 19.7 | 48 |
| control | Na₂CO₃ | 103 | |
| 45 | Na₂CO₃ + JEFFAMINE ® T-403 | 61.1 | 41 |
| control | EDTA | 84.2 | |
| 46 | EDTA + JEFFAMINE ® T-403 | 19.8 | 76 |
| control | citrate | 57.0 | |
| 47 | citrate + JEFFAMINE ® T-403 | 37.2 | 35 |
| control | TRILON ® M | 91.0 | |
| 48 | TRILON ® M + JEFFAMINE ® T-403 | 30.2 | 67 |
| control | citric acid | 62.1 | |
| 49 | citric acid + JEFFAMINE ® T-403 | 64.5 | (−3.9) |

*Avg. of at least 3 experiments. TRILON ® M liquid, product of BASF
All examples tested at 1.0 wt. % actives (0.90% BIO-SOFT ® N91-6 + 0.10% JEFFAMINE ® T-403).

As discussed earlier, Table 8 shows that builders can adversely impact film/streak performance, but that at least in some cases, the negative effect can be offset or eliminated by including a polyetheramine. For example, JEFFAMINE® T-403 completely negated any adverse impact of EDTA on film/streak performance (see Ex. 46).

Table 9 (below) shows, also as previously noted, that film/streak performance is improved over a wide pH range, except at pH 11 and above, where the presence of strong base (monoethanolamine) overwhelms any benefit of the polyetheramine additive.

TABLE 9

Film/Streak Results: Effect of pH: MAKON ® DA-6 and JEFFAMINE ® T-403

| Ex. | MAKON ® DA-6 with or without JEFFAMINE ® T-403 at pH 3 to 11 | Film/streak value*, ceramic tile | % improved v. control |
|---|---|---|---|
| blank | No product applied | 9.7 | |
| control | DA-6, pH 11 | 49.7 | |
| C50 | DA-6 + T-403, pH 11** | 62.9 | (−27) |
| control | DA-6, pH 9*** | 49.1 | |
| 51 | DA-6 + T-403, pH 9 | 11.5 | 77 |
| control | DA-6, pH 7*** | 66.2 | |
| 52 | DA-6 + T-403, pH 7 | 18.1 | 73 |
| control | DA-6, pH 5*** | 77.0 | |
| 53 | DA-6 + T-403, pH 5 | 17.9 | 77 |
| control | DA-6, pH 3*** | 40.4 | |
| 54 | DA-6 + T-403, pH 3 | 21.7 | 46 |

*Avg. of at least 3 experiments.
**Monoethanolamine used to raise pH to 11.0.
***Aq. HCl solution (1% or 3%) used to lower pH to 9.0, 7.0, 5.0, or 3.0.
All examples tested at 1.0 wt. % actives (1.0% MAKON ® DA-6 or 0.90% MAKON ® DA-6 with 0.10% JEFFAMINE ® T-403).

Table 10 (below) demonstrates that dramatically improved film/streak performance can be achieved by spiking a small proportion of polyetheramine into a fully formulated hard surface cleaner, in this case, either BONA® stone floor cleaner or Armstrong Once 'n Done® floor cleaner.

Table 11 (also below) shows that incorporation of an amine functionality into a molecule having a hydrophobic backbone, particularly a hydrophobic polyether, can provide a similar benefit for film/streak properties in a single molecule rather than using a mixture of a polyetheramine and a nonionic alkoxylated surfactant.

TABLE 10

Film/Streak Results: Addition of Polyetheramine to Tile Floor Cleaners

| Ex. | Cleaner formulation | Film/streak value*, ceramic tile | % improved v. control |
|---|---|---|---|
| blank | No product applied | 11.3 | |
| control | BONA ® stone floor cleaner | 22.8 | |
| 55 | BONA ® stone floor cleaner + 0.02% JEFFAMINE ® T-403 | 13.2 | 42 |
| blank | No product applied | 13.6 | |
| control | Armstrong Once 'n Done ® floor cleaner | 25.4 | |
| 56 | Armstrong Once 'n Done ® floor cleaner + 0.1% JEFFAMINE ® T-403 | 12.9 | 49 |

*Avg. of at least 3 experiments

TABLE 11

Film/Streak Results: Amine-Functional Hydrophobe** versus Alkoxylates

| Ex. | Alkoxylate | Film/streak value*, ceramic tile |
|---|---|---|
| blank | No product applied | 11.4 |
| C57 | BIO-SOFT ® N1-9, 1% | 48.2 |
| C58 | MAKON ® DA-6, 1% | 79.3 |
| 59 | 2-(N-methylanilino)ethanol-14PO-4EO, 1% | 26.6 |
| 60 | 2-(N-methylanilino)ethanol-14PO-6EO, 1% | 26.2 |
| 61 | 2-(N-methylanilino)ethanol-14PO-8EO, 1% | 32.3 |

*Avg. of at least 3 experiments
**Un-neutralized alkoxylates

Table 12 (below) shows that the nonionic surfactant can be a siloxane alkoxylate, particularly a siloxane ethoxylate, such as the silane alkoxylates supplied by Momentive Performance Materials, Inc. under the SILWET® mark. The improvement in film/streak performance is particularly evident with SILWET® L-77. The formulation of Example 62 demonstrates super wetting properties when applied to luxury vinyl tile, which is difficult to wet. The same formulation also demonstrates excellent anti-fogging on glass.

TABLE 12

Film/Streak Results: Siloxane alkoxylates and JEFFAMINE ® T-403

| Ex. | Alkoxylate | Film/streak value*, ceramic tile | % improved v. control |
|---|---|---|---|
| blank | No product applied | 10.3 | |
| control | SILWET ® L-77 | 87.6 | |

TABLE 12-continued

Film/Streak Results: Siloxane alkoxylates and JEFFAMINE ® T-403

| Ex. | Alkoxylate | Film/streak value*, ceramic tile | % improved v. control |
|---|---|---|---|
| 62 | SILWET ® L-77 + JEFFAMINE ® T-403 | 11.6 | 87 |
| control | SILWET ® Hydro 611 | 56.3 | |
| 63 | SILWET ® Hydro 611 + JEFFAMINE ® T-403 | 32.4 | 42 |
| control | SILWET ® L-7280 | 54.3 | |
| 64 | SILWET ® L-7280 + JEFFAMINE ® T-403 | 24.9 | 54 |

*Avg. of at least 3 experiments
Except as indicated otherwise, all examples tested at 1.0 wt. % actives (0.10 wt. % JEFFAMINE ® T-403, 0.90 wt. % SILWET ® siloxane alkoxylate).

Example 65

To demonstrate that combinations of siloxane alkoxylates and other nonionic surfactants can be used, a concentrate is prepared from MAKON® UD-6 (a branched $C_{11}$ 6EO ethoxylate, Stepan Co.) at 80 wt. %, SILWET® L-77 (or other siloxane alkoxylates) at 10 wt. %, and JEFFAMINE® T-403 at 10 wt. %. Dilution of the concentrate provides solutions that wet luxury vinyl tile even at 0.05 wt. % solids.

Additional experiments are performed to demonstrate the value of combining an alcohol ethoxylate (BIO-SOFT® N25-7, a $C_{12}$-$C_{15}$ alcohol 7EO ethoxylate) with a siloxane alkoxylate (SILWET® 77) and a polyetheramine (JEFFAMINE® T-403). The formulation of Example 69 provides low film/low streak benefits while maintaining good foaming and wetting properties on storage.

TABLE 13

Combination of Nonionic Surfactants and JEFFAMINE ® T-403

| Example | C66 | C67 | C68 | 69 |
|---|---|---|---|---|
| | Formulation, wt. % | | | |
| SILWET ® 77 | 0.10 | 0.10 | 0.10 | 0.10 |
| JEFFAMINE ® T-403 | 0 | 0.10 | 0 | 0.10 |
| BIO-SOFT ® N25-7 | 0 | 0 | 0.90 | 0.90 |
| deionized water | 99.90 | 99.80 | 99.00 | 98.90 |
| pH | 6-7 | 10.5-11.5 | 6-7 | 10.5-11.5 |
| | Performance | | | |
| Foaming, initial, 25° C. | good | fair | excellent | excellent |
| Foaming, initial, 50° C. | good | fair | excellent | excellent |
| Foaming, 1-week, 25° C. | good | poor | excellent | excellent |
| Foaming, 1-week, 50° C. | good | poor | excellent | excellent |
| LVT wetting, initial | good | good | good | good |
| LVT wetting, 1-week | good | poor | good | good |
| Low film/low streak | no | yes | no | yes |

LVT = luxury vinyl tile; BIO-SOFT ® N25-7 is a product of Stepan.

Comparative Example C66 exhibits good foaming and wetting properties, but lacks desirable low film/low streak properties. Introducing JEFFAMINE® T-403 (Comparative Example C67) addresses the film/streak issue, but foaming and wetting performance are quickly sacrificed. Combining excess alcohol ethoxylate with the siloxane alkoxylate gives desirable foaming and wetting properties (Comparative Example C68) that are retained when enough JEFFAMINE® T-403 in included to achieve the desired low film/low streak performance (Example 69). Micellization of the siloxane alkoxylate by the alcohol ethoxylate may insulate the former nonionic surfactant from hydrolysis under the basic conditions.

The preceding examples are meant only as illustrations; the following claims define the scope of the invention.

We claim:

1. A dilutable concentrate for hard surface cleaners with improved film/streak performance on high-energy surfaces, comprising:
   (a) 25 to 95 wt.% of a nonionic alkoxylated surfactant;
   (b) 2 to 30 wt.% of a polyetheramine; and
   (c) optionally, up to 50 wt.% of a cosolvent, a builder, an auxiliary surfactant, or a mixture thereof, said wt.% values based on the amount of dilutable concentrate, wherein the nonionic alkoxylated surfactant is a mixture comprising 80 to 99 wt.% of an alcohol ethoxylate and 1 to 20 wt.% of a trisiloxane alkoxylate.

2. The concentrate of claim 1 wherein the polyetheramine has an average amine functionality within the range of 1 to 8.

3. The concentrate of claim 1 wherein the auxiliary surfactant is an anionic surfactant, an amphoteric surfactant, a zwitterionic surfactant, a cationic surfactant, an alkyl polyglucoside, or a combination thereof.

4. A dilutable concentrate for hard surface cleaners with improved film/streak performance on high-energy surfaces, comprising:
   (a) 30 to 90 wt.% of a nonionic alkoxylated surfactant;
   (b) 2 to 30 wt.% of a polyetheramine comprising at least one primary amino group and having a number-average molecular weight of 300 to 5,000 g/mol and at least 50 mole% of oxypropylene units, oxybutylene units or both, based on the combined amounts of oxyalkylene units;
   (c) optionally, up to 50 wt.% of a cosolvent, a builder, an auxiliary surfactant, or a mixture thereof, said wt.% values based on the amount of dilutable concentrate, and
   (d) lactic acid.

5. A hard surface cleaner comprising water and the concentrate of claim 1.

6. The cleaner of claim 5 comprising 50 to 99.9 wt.% of water based on the amount of cleaner.

7. The cleaner of claim 5 formulated at a pH within the range of 3.0 to 9.0.

8. A dilutable concentrate for hard surface cleaners with improved film/streak performance on high-energy surfaces, comprising:
   (a) 30 to 90 wt.% of a nonionic alkoxylated surfactant selected from the group consisting of $C_8$-$C_{14}$ alcohol alkoxylates, EO-PO block copolymers, alkoxylated fatty amides, alkoxylated oils, alkoxylated carbohydrate esters, siloxane alkoxylates, and mixtures thereof;
   (b) 2 to 20 wt.% of lactic acid;
   (c) optionally, up to 50 wt.% of a cosolvent, a builder, an auxiliary surfactant, or a mixture thereof, said wt.% values based on the amount of dilutable concentrate; and
   (d) 2.0 to 20.0 wt.% of a polyetheramine comprising at least one primary amino group and having a number-average molecular weight of 300 to 5,000 g/mol and at least 50 mole% of oxypropylene units, oxybutylene unites or both, based on the combined amounts of oxyalkylene units.

9. A hard surface cleaner comprising 50 to 99.9 wt% of water based on the amount of cleaner and a dilutable concentrate comprising:
   (a) 30 to 90 wt.% of a nonionic alkoxylated surfactant selected from the group consisting of $C_8$-$C_{14}$ alcohol alkoxylates, EO-PO block copolymers, alkoxylated fatty amides, alkoxylated oils, alkoxylated carbohydrate esters, siloxane alkoxylates, and mixtures thereof;
   (b) 2 to 20 wt.% of lactic acid; and
   (c) optionally, up to 50 wt.% of a cosolvent, a builder, an auxiliary surfactant, or a mixture thereof, said wt.% values based on the amount of dilutable concentrate.

10. The dilutable concentrate of claim 1 wherein the nonionic alkoxylated surfactant is present in an amount from 40 to 85 wt.%.

11. The dilutable concentrate of claim 8 wherein the nonionic alkoxylated surfactant is present in an amount from 40 to 85 wt.%.

* * * * *